No. 862,410. PATENTED AUG. 6, 1907.
R. O. NEWPORT.
SPRING WHEEL.
APPLICATION FILED JAN. 2, 1907.
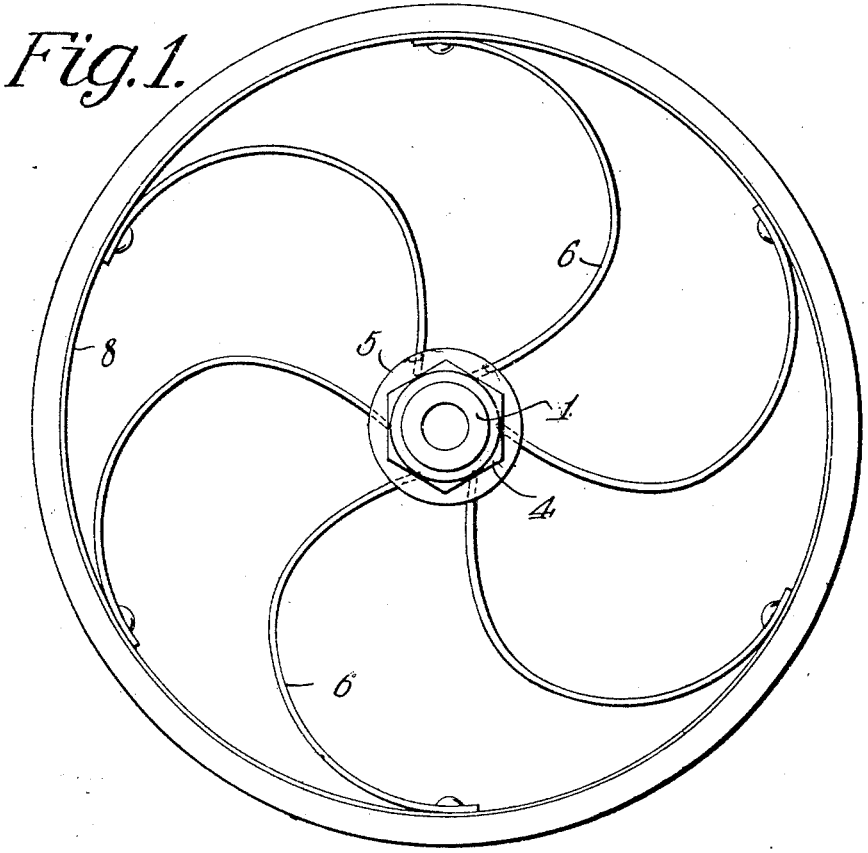
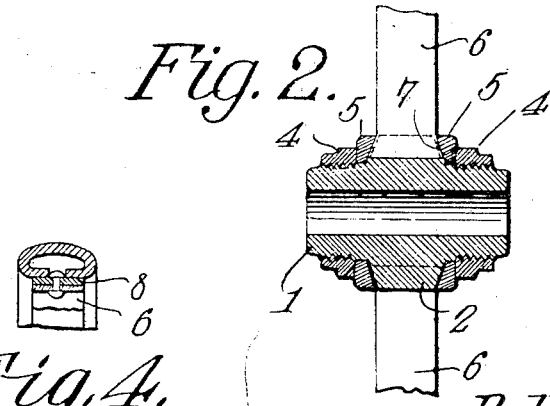
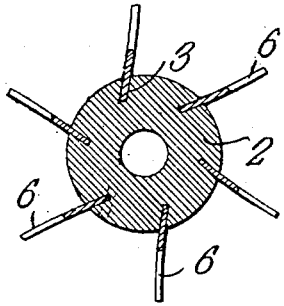
WITNESSES:
Rollen O. Newport,
INVENTOR.
By C. A. Snow & Co.
ATTORNEYS
THE NORRIS PETERS CO., WASHINGTON, D. C.

UNITED STATES PATENT OFFICE.

ROLLEN OTTO NEWPORT, OF GARDEN CITY, KANSAS.

SPRING-WHEEL.

No. 862,410.  Specification of Letters Patent.  Patented Aug. 6, 1907.

Application filed January 2, 1907. Serial No. 350,380.

*To all whom it may concern:*

Be it known that I, ROLLEN OTTO NEWPORT, a citizen of the United States, residing at Garden City, in the county of Finney and State of Kansas, have invented a new and useful Spring-Wheel, of which the following is a specification.

This invention relates to carriage wheels, more particularly to wheels in which spring spokes are utilized to provide resiliency therein; and has for its object the provision of a wheel of the character described that is simple, strong and durable in construction, that may be taken apart and repaired at little cost, and that may be used upon any ordinary axle.

The invention consists in the novel construction, combination and arrangement of parts hereinafter fully described, claimed, and illustrated in the accompanying drawings, in which,—

Figure 1 is a side elevation of a wheel constructed in accordance with this invention; Fig. 2 is a central longitudinal section through the hub of the wheel. Fig. 3 is a central transverse section of the hub, and Fig. 4 is a transverse sectional view of the rim.

Referring to the drawings, the hub 1 is constructed of metal and has a central annular collar 2 formed integral therewith, having outwardly-converging sides and provided with tangential slots 3 adapted to receive the inner ends of the spokes. The ends of said hub are screw-threaded externally and provided with correspondingly threaded nuts 4. Between the nuts and the collar are washers 5 having cupped inner faces conforming to the converging adjoining sides of the collar. The spokes 6 are made preferably of spring steel, and have laterally-extending oppositely-disposed wings or lugs 7 upon the inner ends thereof adapted to fill the slots in the hub collar and to be held in place by the cupped washers and nuts embracing said collar, the lugs 7 being of slightly greater width than the collar in order to insure positive contact between them and the washers. The spokes are sprung into symmetrical curves and their outer ends are secured to the rim of the wheel by riveting or other suitable means.

In the construction illustrated, the rim is of C shape in cross section, as indicated in Fig. 4, and a thin annular metallic spoke-securing band 8 covers the open inner side of the rim and has the extremities of the spokes attached thereto by rivets or similar fastening devices, the heads of which are disposed within the space between the opposed edges of the rim to hold the band in position.

Having thus fully described the invention, what is claimed and desired to be secured by Letters Patent is:—

In a wheel, the combination of a hub having threaded opposite ends and a central annular collar having downwardly-converging sides and tangential slots, curved spring spokes having lateral extensions at their inner ends of slightly greater width than the collar and disposed within the slots, cupped washers to engage the spoke end extensions, and nuts to secure the washers in place.

In testimony that I claim the foregoing as my own, I have hereto affixed my signature in the presence of two witnesses.

ROLLEN OTTO NEWPORT.

Witnesses:
ELMER COLLINS,
P. M. LAWRENCE.